United States Patent
Knowles et al.

(10) Patent No.: US 7,154,813 B2
(45) Date of Patent: Dec. 26, 2006

(54) PRESSURE SENSITIVE SENSOR FOR REAL-TIME RECONFIGURABLE SONAR APPLICATIONS

(75) Inventors: Gareth Knowles, Williamsport, PA (US); Eli Hughes, State College, PA (US)

(73) Assignee: QorTek, Inc., Williamsport, PA (US)

( * ) Notice: Subject to any disclaimer, the term of this patent is extended or adjusted under 35 U.S.C. 154(b) by 332 days.

(21) Appl. No.: 10/894,150

(22) Filed: Jul. 19, 2004

(65) Prior Publication Data
US 2006/0002235 A1 Jan. 5, 2006

Related U.S. Application Data

(60) Provisional application No. 60/488,940, filed on Jul. 19, 2003.

(51) Int. Cl.
*H04R 17/00* (2006.01)
(52) U.S. Cl. ........................... 367/181
(58) Field of Classification Search ............. 367/181
See application file for complete search history.

(56) References Cited

U.S. PATENT DOCUMENTS

| | | | |
|---|---|---|---|
| 4,628,490 A | 12/1986 | Kramer et al. | |
| 5,166,907 A | 11/1992 | Newnham et al. | |
| 6,046,417 A | * 4/2000 | Menze | 200/512 |
| 6,404,106 B1 | 6/2002 | Dale et al. | |
| 6,671,230 B1 | 12/2003 | Benjamin | |
| 6,711,096 B1 | 3/2004 | Benjamin | |
| 2003/0205450 A1 | * 11/2003 | Divigalpitiya et al. | 200/512 |

\* cited by examiner

*Primary Examiner*—Dan Pihulic
(74) *Attorney, Agent, or Firm*—Michael Crilly, Esq.

(57) ABSTRACT

A sensor with sound navigation and ranging applications is presented. The invention includes a pressure conduction composite sandwiched between electrically conductive elements so as to sense pressure associated with an acoustic wave via a change in conductance within the composite. One electrically conductive element is rigid and includes the hull of a vessel or wall of a sea-based device. The pressure conduction composite is composed of a non-conductive matrix having a conductive fill at or near the percolation threshold of the material system. The pressure conduction composite is highly resistive in its uncompressed state. However, resistance decreases with increasing compression. In preferred embodiments, sensors are arranged in an array architecture including planar and conformal configurations. The present invention has immediate application in submarines, ships, and sonobuoys.

13 Claims, 7 Drawing Sheets

PRESSURE SENSITIVE SENSOR FOR REAL-TIME RECONFIGURABLE SONAR APPLICATIONS

CROSS REFERENCE TO RELATED APPLICATIONS

This application is based upon and claims priority under 35 U.S.C. §119(e) from U.S. Provisional Patent Application No. 60/488,940 filed Jul. 19, 2003, entitled Pressure Sensitive Sensor with Sonar Applications, the contents of which are hereby incorporated by reference.

FEDERALLY SPONSORED RESEARCH AND DEVELOPMENT

None.

BACKGROUND OF THE INVENTION

1. Field of the Invention

The present invention generally relates to a sensor with sound navigation and ranging applications. Specifically, the invention is a passive sensor including a pressure conduction composite sandwiched between two electrically conductive elements so as to sense pressure produced by an acoustic wave via a change in conductance of the composite. Sensors may be arranged to form a new variety of dynamically reconfigurable phased arrays.

2. Description of the Related Art

Sound navigation and ranging, commonly referred to as sonar, is based on the propagation of acoustic signals. An acoustic signal in water is most easily described as a mechanical wave that pushes and pulls water molecules adjacent to the wave as it propagates through water. The result is a localized pressure fluctuation around a mean wherein wave amplitude is the peak pressure reached in one cycle. Wave signals may include simple, single-frequency sinusoidal patterns and complex, multi-frequency patterns.

Sonar systems are categorized as either active or passive. In an active sonar system, an acoustic wave source is part of the sonar system so that acoustic waves are both transmitted and received. Transducers are employed to convert one energy form to another. For example, a hydrophone may convert energy in an acoustic wave to electrical energy and a projector may convert electrical energy to an acoustic wave.

In a passive sonar system, the object of interest is the source of the acoustic wave. As such, a transducer receives acoustic waves and converts energy in the acoustic wave to electrical energy. Unlike active systems, source level is generally not known beforehand and must be gathered via other means.

In sonar applications described in the related arts, multiple transducers are arranged in a dimensionally-fixed, geometric pattern, often referred to as an 'array' or 'phased array', to capture an incoming acoustic wave.

The general principal behind the use of an array to receive and to transmit acoustic waves is that the arrival phase of the incoming pressure wave is different for each transducer in the array. When signals are combined from all transducers, differently phased signals may add to each other, null each other out, or sum to an intermediate value. Spacing between transducers may be employed to create a 'beam' allowing acoustic waves from one or more directions to pass through the transducer array while allowing waves from other directions to be attenuated.

Processing techniques may be employed to enhance the characteristics of the beam. For example, shading is a process by which a transducer signal is either changed in amplitude or electronically phased relative to the signals from the other transducers in the array. Shading allows a beam from the array to be steered in a preferred direction. Transducer arrangement, examples include linear one-dimensional arrays, two-dimensional grids, and three-dimensional cubes and cylinders, further enhances beam properties. It is common for transducers to be spaced at some fraction of the characteristic wavelength of the sonar system.

The related arts include a variety of static arrays with fixed dimensional properties. For example, Benjamin, U.S. Pat. No. 6,671,230, describes a three-dimensional arrangement of electro-strictive polymer elements to transmit and receive in different directions.

Piezoelectric materials and piezoelectric polymer composites are typically employed within transducers for use within sonar systems. Piezoelectricity is the ability of a material to produce an electric charge when subjected to mechanical stress. The effect is reversible so that the piezoelectric material changes shape when subject to an externally applied electric charge. Piezoelectric lead zirconate titanate (PZT) and barium titanate (BT) ceramics and piezoelectric polyvinylidene fluoride (PVDF) and poly(vinylidene fluoride-co-trifluoroethylene) (PVDF-TrFE) polymers are several exemplary materials used within transducers comprising sonar systems from the related arts.

Piezoelectric materials and piezoelectric polymer composites are inherently problematic in sonar applications. For example, ferroelectrics are susceptible to the deleterious effects of salt water. As such, ferroelectric materials require special packaging to allow for direct placement in seawater. In another example, the physical nature of piezo-polymers limits the magnitude of the output signal and the signal-to-noise ratio. As such, piezo-polymers require a great deal of amplification and signal conditioning. Also, piezoelectric materials must operate around their resonance for better signal sensitivity thereby limiting bandwidth. Frequency agility may be improved by mechanical or electrical tuning the resonance of the piezoelectric material, as addressed by Newnham et al. in U.S. Pat. No. 5,166,907. However, tuning increases cost and complexity of the transducer.

Therefore, what is currently required is a less expensive, electrically and mechanically simple transducer for sonar applications that minimizes signal amplification and filtering requirements.

Furthermore, what is currently required is an array of non-piezoelectric transducers capable of being reconfigured in real-time without mechanical devices so as to alter the performance characteristics of a sonar system.

SUMMARY OF INVENTION

An object of the present invention is to provide a less expensive, electrically and mechanically simple sensor that minimizes signal-processing requirements.

A further object of the present invention is to provide a sensor whose function is not dependent on piezoelectricity.

A further object of the present invention is to provide a sensor that is applicable to large planar and conformal arrays.

The present invention is comprised of an electrically conductive outer layer, an electrically conductive and rigid or rigidly supported inner layer, and a composite layer disposed between and bonded to both outer and inner layers. The composite in the present invention is composed of a plurality of conductive particles electrically isolated within a non-conductive matrix. The volume fraction of conductive particles within the composite is at or near the critical percolation threshold so as to achieve a conductance that increases with pressure. Unlike piezoelectric materials that interchange mechanical energy and charge, the composite material of the present invention interchanges mechanical energy and electrical conductance.

In alternate embodiments, the composite may have a plurality of voids. In yet other embodiments, a waterproof coating is provided over the sensor so as to prevent direct contact between sensor and surrounding environment. It is preferred that the rigid layer be the exterior of a watercraft or sonar device or supported thereby.

A plurality of sensors may be arranged in a phased array architecture including planar and conformal configurations. Phased arrays are amenable to a variety of electrical connection topologies that conjoin some or all sensors in the array into a single sensor, partition sensors into two or more blocks of conjoined sensors, or individually address sensors in complex configurations. The described array architecture coupled with reconfigurable electrical topologies facilitates a non-mechanical, frequency-agile system.

The present invention provides several advantages over sonar transducers and arrays described in the related arts.

The composite of the present invention is highly sensitive so that use around resonance is not required. As such, the present invention has broadband application so as to facilitate sensitivity at two or more sonar frequencies without the use of tuning mechanisms. Furthermore, the mechanical resonance of the composite, due to its small mass and high stiffness, is far above the low frequencies typically encountered in sonar applications.

The present invention provides greater signal gain than known transducers. Greater signal strength improves the signal-to-noise ratio characteristics of the sensor and allows for integrated beam forming and directional source assessment.

The present invention provides higher signal strength thereby simplifying and streamlining electrical circuits required to amplify and condition the output signal from the composite.

The present invention yields sensitivities at least several orders of magnitude greater than piezoelectric polymers.

The present invention is substantially lighter than sonar transducers and arrays described in the related arts.

The present invention is resistant to the deleterious effects of seawater.

The presented area of an individual sensor is extremely small thereby facilitating high-density arrays affording greater resolution.

The present invention is amenable to matrix addressed phased array configurations. As such, arrays of transducers may be employed to achieve an arbitrary array geometry and broadband frequency operation without the use of mechanical devices.

The present invention may be manufactured via conventional lamination and extrusion techniques.

BRIEF DESCRIPTION OF THE DRAWINGS

The invention will now be described in more detail, by way of example only, with reference to the accompanying drawings, in which.

REFERENCE NUMERALS

Figure 1A:
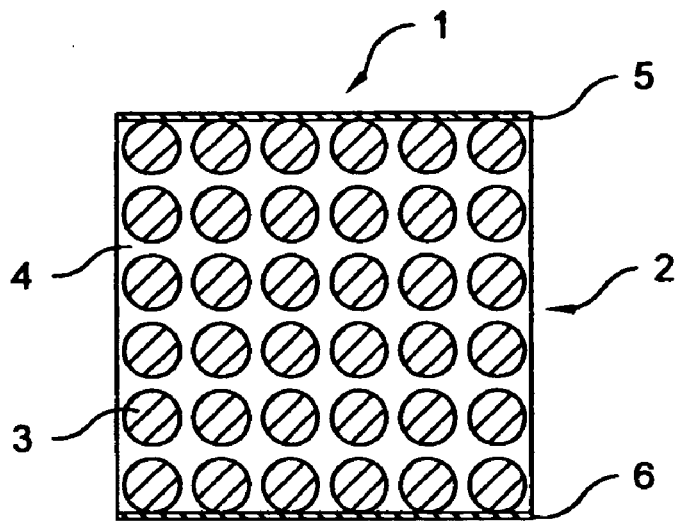
FIG. 1a is a schematic diagram showing a pressure conduction composite, composed of a non-conductive matrix having conductive particles electrically isolated therein, sandwiched between two conductive elements.

1 Sensor
2 Pressure conduction composite
3 Conductive particle
4 Matrix
5 Conductive element
6 Conductive element
7 Force
8 Rigid element
9 Array
10 Thickness
11 Pressure conduction composite
12 Movable element
13 Perforations
14 Inactive sensor
15 Submarine
19 Active sensor
20 Sensor sub-array
21 Receiver array
22 Sensor
23 Resistor
24 Ground
25 Signal conditioning/buffer element
26 Sensor control switch
27 Sensor select/shading control signal
28 Array summing circuitry
29 Structure

DETAILED DESCRIPTION OF THE INVENTION

Referring now to FIG. 1a, a schematic representation of the sensor 1 is shown comprising a pressure conduction composite 2 disposed between two conductive elements 5, 6. Components are not to scale. Conductive elements 5, 6 include a variety of materials, such as metals and composites. Pressure conduction composite 2 is composed of conductive particles 3 within a non-conductive yet compressible and resilient matrix 4. The matrix 4 is a solid that surrounds and isolates the conductive particles 3 so as to maximize resistance and minimize conductance thereby preventing current flow between conductive elements 5, 6 at ambient pressure.

Figure 1B:
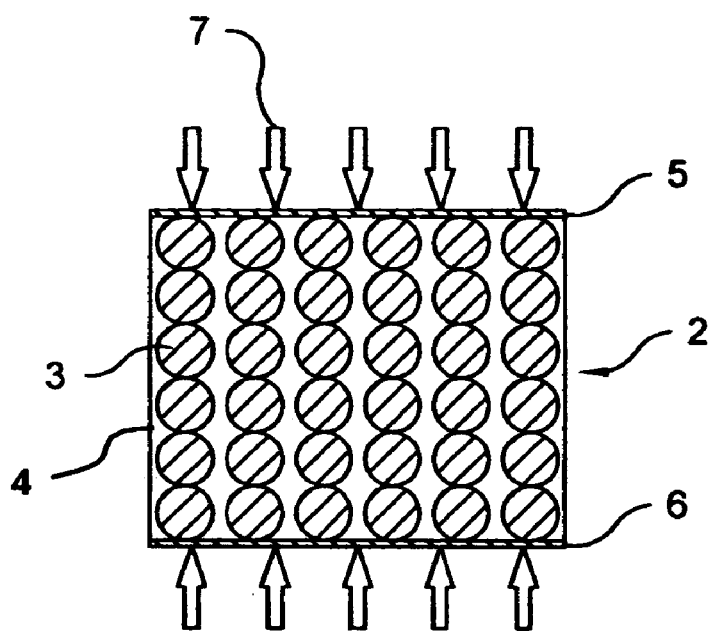
FIG. 1b is a schematic diagram showing pressure conduction composite and conductive elements from FIG. 1a after compression of the composite so as to allow electrical connectivity between particles.

Referring now to FIG. 1b, distance between conductive particles 3 decreases with increasing force 7 thereby reducing resistance and increasing conductance. In the present invention, force 7 is produced by an acoustic wave interacting with one of the conductive elements 5 or 6 comprising the sensor 1. Maximum conductance is achieved when conductive particles 3 and conductive elements 5, 6 are contacting. The matrix 4 should be sufficiently resilient to allow its recovery after the force 7 is removed. It is desired for the conductive particles 3 to return to their original or nearly original location within the matrix 4.

Figure 2:
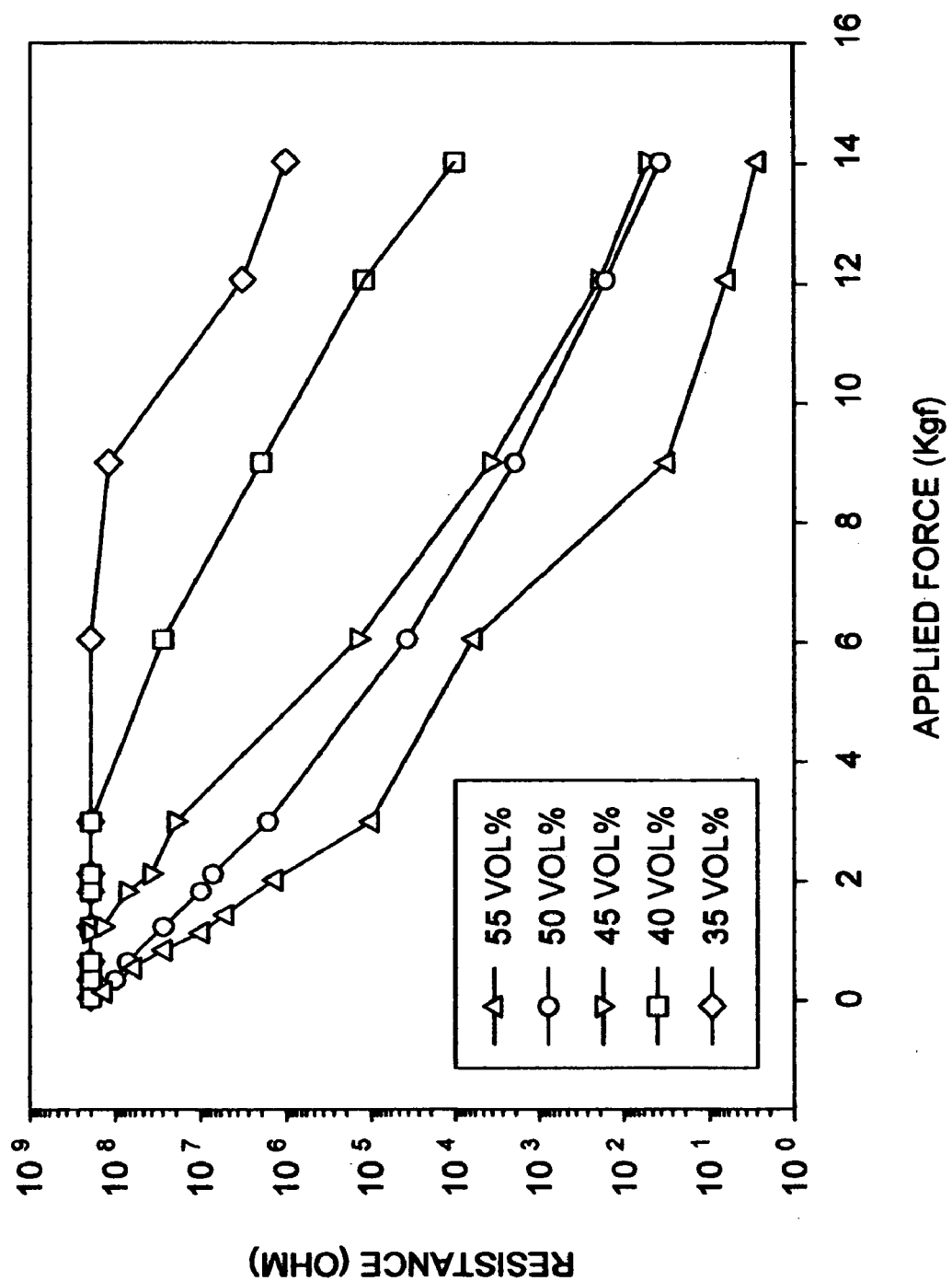
FIG. 2 is a graph showing force dependent resistance for several exemplary titanium-diboride loaded polymer systems.

Referring now to FIG. 2, resistance-force curves are shown for several exemplary pressure conduction composites 2 having titanium-diboride particles within a polymer plate. In general, pressure conduction composites 2 exhibit an extremely large decrease in resistance over a relatively small range of force. The volume fraction of conductive particles 3 influences the resistance-to-force characteristics of the composition thereby allowing the material system to be tailored or tuned for ambient pressure, operating pressures and acoustic wave conditions. It is likewise possible for the pressure conduction composite 2 to be actively biased as a function of constant or changing ambient pressure thereby requiring minimal pressure to produce the desired change in conductance to measure the sound pressure level.

Referring again to FIG. 1a, stoichiometry, thickness and component materials influence the resistance-force profile. It is preferred to have a volume fraction of conductive particles 3 at or near the percolation threshold. Furthermore, it is preferred to have the conductive particles 3 randomly dispersed within the matrix 4 so as to avoid a continuous path between conductive elements 5, 6 at ambient conditions. When compressed, the matrix 4 is dimensionally reduced thereby crossing the percolation threshold.

The matrix 4 may be composed of a one or more electrically resistive, compressible and resilient materials including, but not limited to, polymers and elastomers. Exemplary materials include polyethylene, polystyrene, polyvinyldifluoride, polyimide, epoxy, polytetrafluoroethylene, silicon rubber, polyvinylchloride, and combinations thereof. Preferred embodiments of the present invention were composed of the elastomer RTV R3145 manufactured by the Dow Corning Company.

Conductive particles 3 may include one or more electrically conductive materials including, but not limited to, metals, metal-based oxides, nitrides, carbides, and borides, and carbon black. It is preferred that conductive particles 3 resist deformation when compressed and have a melt temperature sufficiently above the thermal conditions generated during current flow and interrupt. Exemplary materials include aluminum, gold, silver, nickel, copper, platinum, tungsten, tantalum, iron, molybdenum, hafnium, combinations and alloys thereof, $Sr(Fe,Mo)O_3$, $(La,Ca)MnO_3$, $Ba(Pb,Bi)O_3$, vanadium oxide, antimony doped tin oxide, iron oxide, titanium diboride, titanium carbide, titanium nitride, tungsten carbide, and zirconium diboride.

The pressure conduction composite 2 is fabricated via known methods. For example, the pressure conduction composite 2 may be prepared from high-purity feedstocks, mixed, pressed into a solid, and suffused with oil. Conductive elements 5, 6 are thereafter bonded to the pressure conduction composite 2 via an adhesive or vulcanization process. It was preferred to adhesively bond conductive elements 5, 6 to the pressure conduction composite 2 via an epoxy.

Feedstocks include both powders and liquids. Conductive particles 3 were exclusively solid particulates. For example, it was preferred for the feedstock comprising the conductive particles 3 to be a fine, uniform powder, one example being 325-mesh titanium carbide. The non-conductive matrix 4 was fabricated using either a fine, uniform powder or a liquid with sufficient viscosity to achieve adequate dispersion of conductive particles 3 after mixing. Powder-based formulations were mechanically mixed and compression molded using conventional methods. Polytetrafluorethylene and other polymers may require sintering within an oven to achieve a structurally durable solid. Powder-liquid formulations, one example being titanium carbide and a silicone-based elastomer, were vulcanized and hardened within a die under low uniaxial loading at room temperature.

In some embodiments, it may be desired to impregnate the pressure conduction composite 2 with a liquid via a method known as suffusion. The pressure conduction composite 2 is submerged within a bath of one or more inorganic oils, preferable silicone based, thereby allowing complete infiltration of the liquid into the otherwise solid pressure conduction composite 2. The exposure time of the pressure conduction composite 2 is influenced by the dimensional properties and composition of the solid. For example, a pressure conduction composite 2 having a thickness of 0.125-inch, a width of 0.200-inch, and a length of 0.940-inch and composed of titanium carbide with a volume fraction of 66 percent and RTV R3145 with a volume fraction of 34 percent was adequately suffused after a 48 hour period.

Conductive elements 5, 6 are adhered to the pressure conduction composite 2 either before or after suffusion. If before suffusion, conductive elements 5, 6 are placed within a die along with sufficiently mixed composition comprising the pressure conduction composite 2 there between. For example, a matrix 4 composed of a silicone elastomer was adequately bonded to two 0.020-inch thick brass plates by curing the otherwise liquid elastomer at room temperature between 3 to 24 hours or at an elevated temperature between 60 to 120 degrees Celsius for 2 to 10 hours. If after suffusion, a silicone adhesive is applied between pressure conduction composite 2 and conductive plates 5, 6 and thereafter mechanically pressed until the adhesive is cured.

In some embodiments, it may be advantageous for the pressure conduction composite 2 to be porous. Porosity may be required to improve compression and cooling characteristics of the pressure conduction composite 2 without adversely degrading electrical conductance and resistance through the element. Furthermore, porosity may improve the compliance and sensitivity of the sensor 1.

Figure 3:
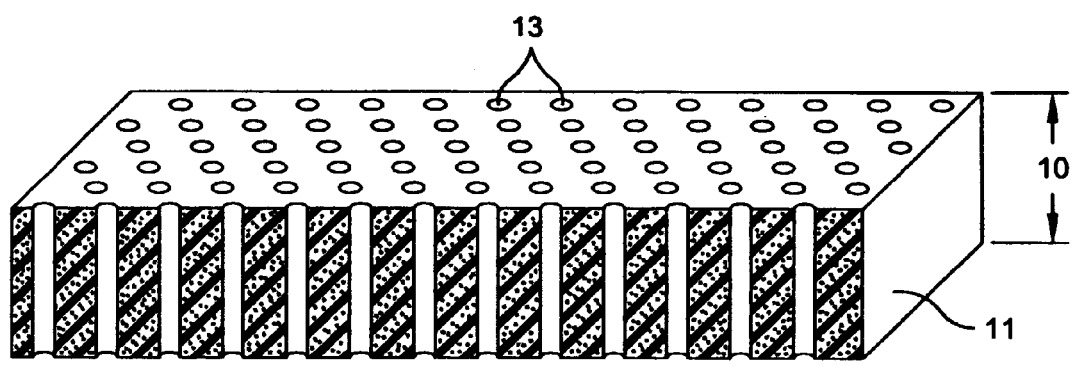
FIG. 3 is a perspective view of a pressure conduction composite having a plurality of perforations through its thickness.

Pores may include a variety of shapes including, but are not limited to, spheres, ellipsoids, cylinders, and irregular shapes. Referring now to FIG. 3, an exemplary planar disposed pressure compression composite 11 is shown having a plurality of cylindrically shaped perforations 13 traversing the thickness 10 of the element.

Pores may be formed by a variety of manufacturing methods. For example, cavities may be mechanically formed by drilling the pressure conduction composition 11. Pores may be introduced during mixing of matrix 4 and conductive particles 3 via the introduction of gas bubbles. It is likewise possible to include microspheres composed of either a low-density foam or hollow, gas filled spheres during the mixing process. Also, cavities may be formed during the curing of the matrix 4 in an oven whereby localized heating or phase transitions yield void formation and growth.

Figure 4:
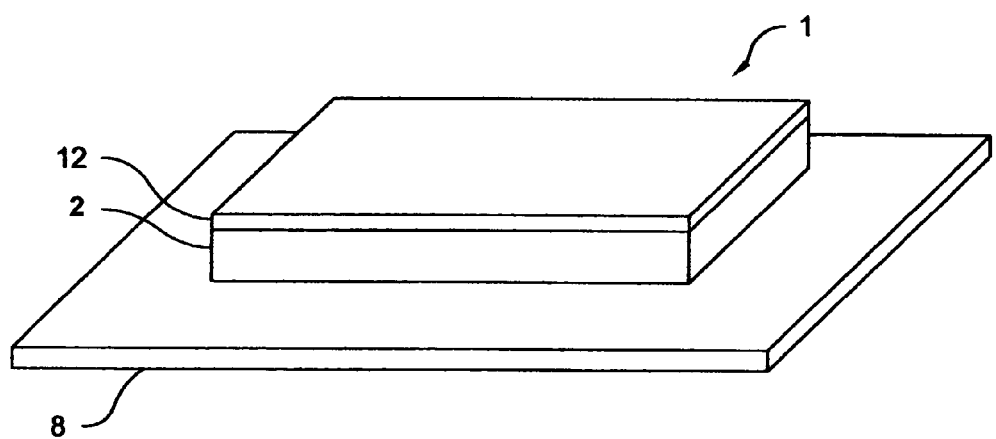
FIG. 4 is a perspective view of an exemplary sensor having a pressure conduction composite sandwiched between movable and rigid elements.

Referring now to FIG. 4, a sensor 1 is shown comprising a rigid element 8 and movable element 12 disposed about a pressure conduction composite 2. Rigid element 8 and movable element 12 are finite-thickness, plate-like components, curved, planar or nearly planar in extent, and having a variety of presented areas including squares, rectangles, and circles. While FIG. 4 shows a rigid element 8 of greater lateral extent than the movable element 12 and pressure conduction composite 2, it is possible for rigid element 8 and movable element 12 to be equal or nearly equal in extent. However, it is preferred that pressure conduction composite 2 and movable element 12 be equal or nearly equal in lateral extent.

It was preferred for the sensor 1 to have one movable and one rigid layer, both adhesively bonded to the pressure conduction composite 2 via a conductive epoxy. The movable element 12 directly contacts the medium within which the acoustic waves reside. Acoustic waves impinge the movable element 12, preferably a conductive metal or composite, so as to displace the movable element 12 into the pressure conduction composite 2. The rigid element 8, preferably a conductive metal or composite, resists deflection and/or movement. It is possible for the rigid element 8 to be the hull of a watercraft, pressure hull of a submarine, or structure of a buoy. The coupled response of movable element 12 and rigid element 8 communicates acoustic waves into the pressure conduction composite 2 by compressing the pressure conduction composite 2 thereby changing the conductance of the latter.

In some embodiments, it may be preferred to apply a waterproof coating known within the art over one or more sensors 1 to prevent direct contact between sensor 1 and surrounding medium. Such coatings are advantageous where movable element 12 and/or rigid element 8 are susceptible to corrosion.

It is likewise possible for the rigid element 8 to be separate from the hull, pressure hull, or structure and applied as an applique thereto and stiffened thereby. As such, the sensor 1 may be adhesively bonded or mechanically fastened to the hull, pressure hull, or structure via techniques understood in the art.

Figure 5:
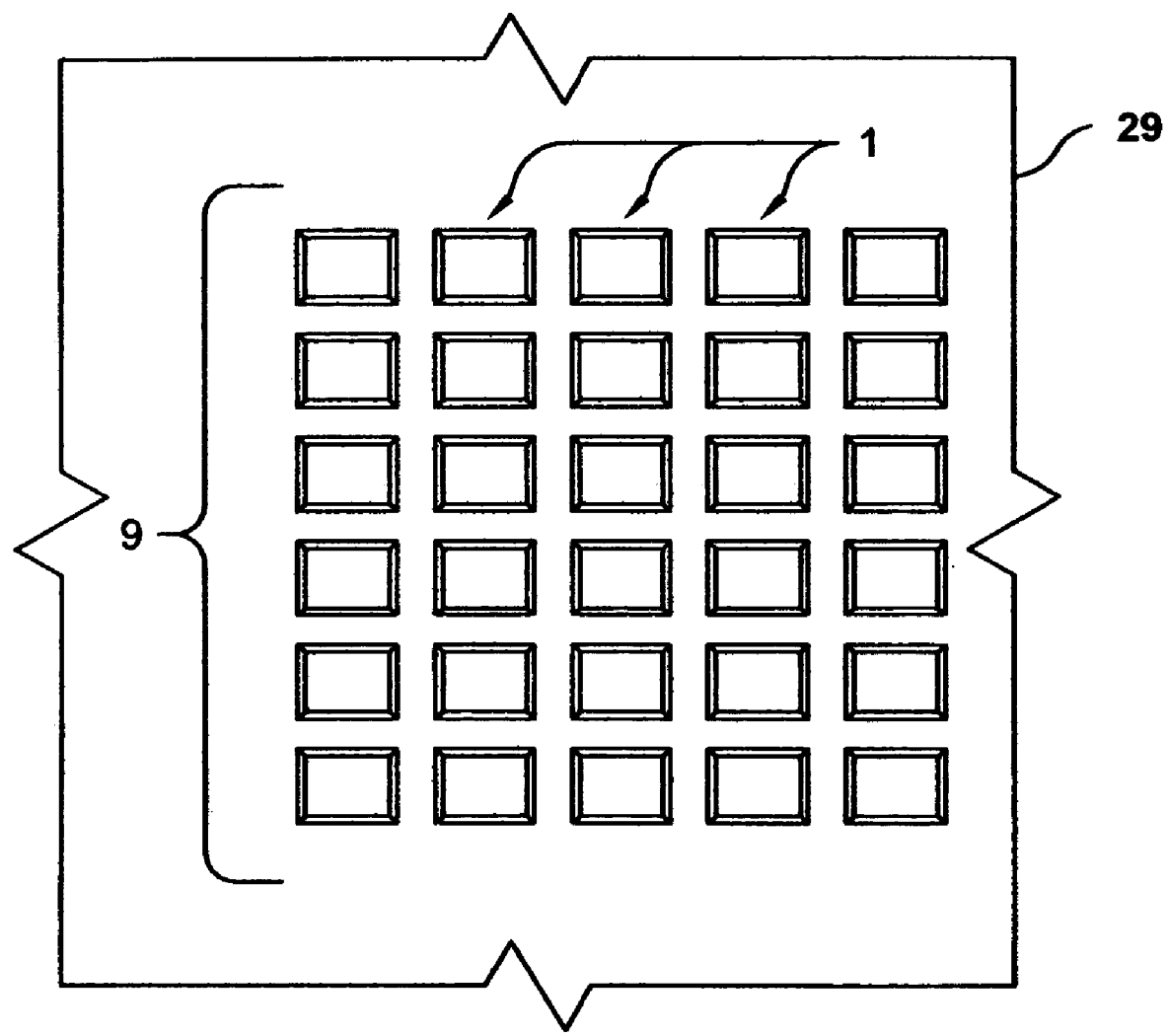
FIG. 5 is a top plan view of an exemplary arrangement of sensors forming an array.

The low profile and compactness of the sensor 1 described above lends itself to arrayed configurations. Referring now to FIG. 5, an array 9 of sensors 1 (5×5) is shown along a structure 29. Conductive elements 5, 6 within each sensor 1 are electrically connected via conventional wires or thin films having conductive traces thereon. Current flow across individual sensors 1 is communicated to a central computer via a row-column matrix architecture similar to that used to control flat panel displays in laptop computers and to that used to control arrays of active devices as described in co-pending U.S. patent application Ser. No. 10/823,237, entitled Matrix Architecture Switch Controlled Adjustable Performance Electromagnetic Energy Coupling Mechanisms using Digital Controlled Single Source Supply, submitted by the present inventors and hereby incorporated herein by reference.

Figure 6:
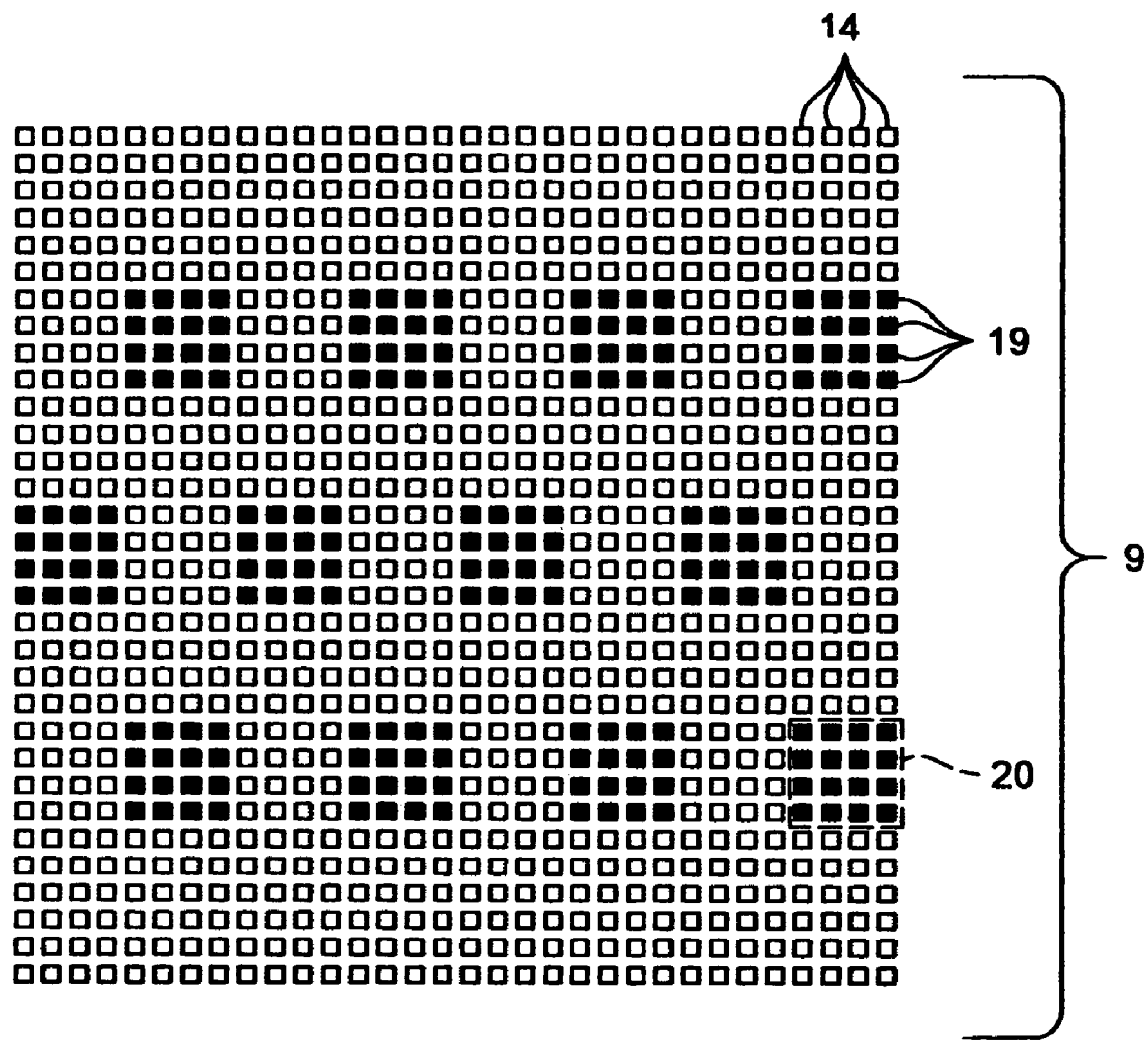
FIG. 6 is a schematic diagram showing a phased array including both inactive and selectively active sensors configured to form several sub-arrays.
Figure 7:
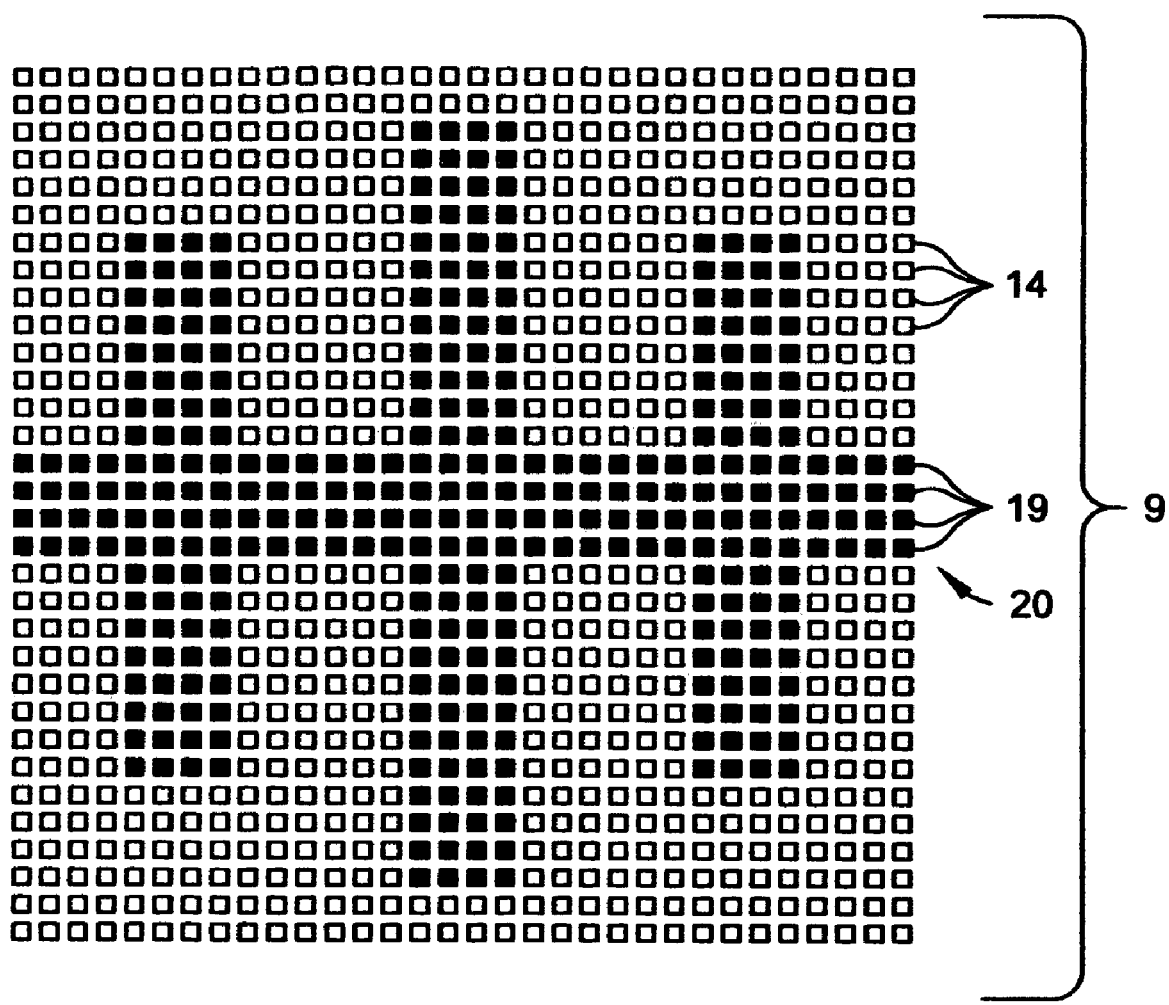
FIG. 7 is a schematic diagram showing a phased array including both inactive and selectively active sensors configured to form a single, complex shaped sub-array.

Referring now to FIGS. 6 and 7, an array 9 (32×32) of sensors 1 is shown to graphically represent two active configurations. For example, FIG. 6 shows active sensors 19 turned ON within the array 9 and surrounded by inactive sensors 14 turned OFF to form twelve sensor sub-arrays 20. The described sensor sub-arrays 20 allow multiple beams to be produced so as to achieve desired gain and fine bearing resolution. In another example, FIG. 7 shows a number of active sensors 19 within an array 9 surrounded by inactive sensors 14 so as to form a single, complex sensor sub-array 20.

The selective reconfiguration of and between active sensors 19 and inactive sensors 14 provides an infinite number of possible active arrangements. Selectivity is controlled by back-plane electronics and configuration of the addressing system. Sensor sub-arrays 20 may be singular in that some or all sensors in the array 9 are active and combined to form one large sensor. It is likewise possible for one or more active sensors 19 to comprise a sensor sub-array 20 partitioned from one or more other sensor sub-arrays 20. Sensor sub-arrays 20 may function independently or in a coordinated fashion. It is also possible for sensor sub-arrays 20 to function independently and thereafter electronically combined via methods used with phased array antennas.

While planar shaped arrays 9 are described in FIGS. 5–7, such arrays 9 may include non-planar designs that effectively match the surface contour of an object. In yet other embodiments, it may be advantageous to stack or layer two or more arrays 9. For example, multi-layer arrays 9 might vary the formulation of the pressure conduction composites 2, vary the density of sensors 1, or differ the host matrix so as to enable either a broader operating range or facilitate a multi-band capability.

Figure 8:
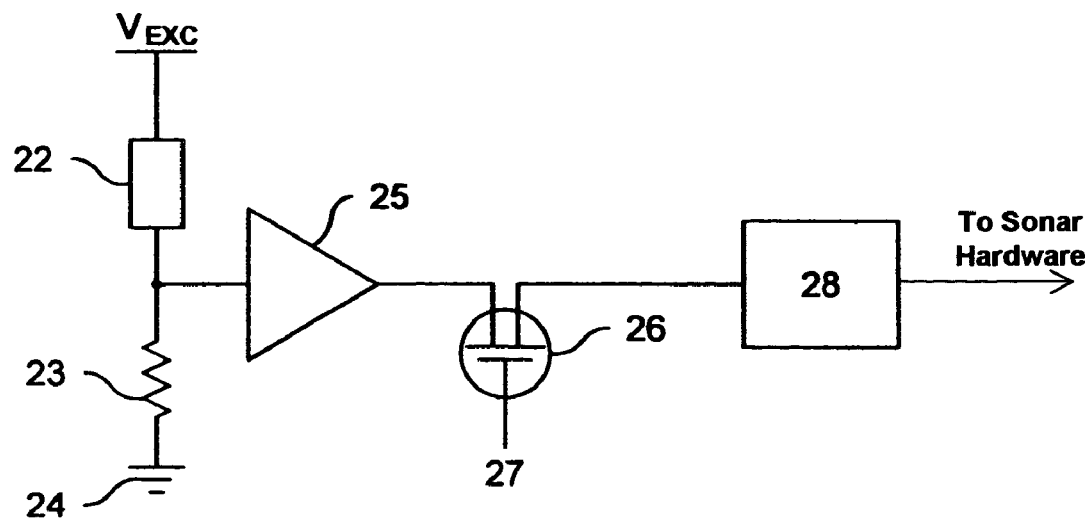
FIG. 8 is an exemplary circuit diagram used to electrically control a single sensor element and communicate sensor data to analysis circuitry.

Referring now to FIG. 8, a circuit diagram is described to enable activation and deactivation of a single sensor 22. In an array 9, each sensor 22 is paired with a circuit unique to that sensor 22. One end of the sensor 22 is electrically connected to a voltage source and the opposite end electrically connected to a resistor 23 and thereafter connected to ground 24. The change in conductance of the sensor 22, and the pressure conduction composite 2 in particular, is evaluated by a simple half-bridge/voltage divider circuit. Since the signal output from the sensor 22 is strong, a simple signal conditioning/buffer element 25 is electrically connected at one end between sensor 22 and resistor 23. The opposite end of the signal conditioning/buffer element 25 is electrically connected to a sensor control switch 26. The sensor control switch 26 is electrically connected inline with the output signal from the sensor 22 so as to enable ON/OFF control. It is likewise possible for the sensor control switch 26 to be operated in its variable conductance region so as to enable amplitude shading via a sensor selection/shading control signal 27. While a variety of commercially available devices are applicable to the sensor control switch 26, a Field Effect Transistor (FET) switch controlled by a microcontroller, DSP, FPGA or DAC was preferred. The output signal is processed via an array summing circuitry 28 electrically connected to the sensor control switch 26. Summing within the array summing circuitry 28 may be achieved actively with operational amplifiers or passively with a resistor-summing network. After summing, the output signal is sampled by sonar hardware understood in the art.

The circuit diagram described above may be implemented onto the sensor 22 or deposited onto an electronics layer that communicates with multiple sensors 22. The electronics layer incorporates interconnect logical to enable a reconfigurable electrical topology facilitating a dynamically agile array 9. Basic circuitry also resides on the electronics layer to convert the conductance of the pressure conduction composite 2 into a clean usable signal to be combined with signals from other sensors 22. Sensor control switches 26 may also be implemented onto the electronics layer. The electronic layer may reside on a variety of substrates, examples including standard FR-4 circuit boards and flexible thin films. In some embodiments, it may be preferred to have FETs implemented as embedded Thin-Film Transistors (TFT) deposited directly on the electronic layer. The electronic layer may be part of a hull, pressure hull, or sonobuoy or applied as an applique onto one of the before mentioned structures.

Figure 9:
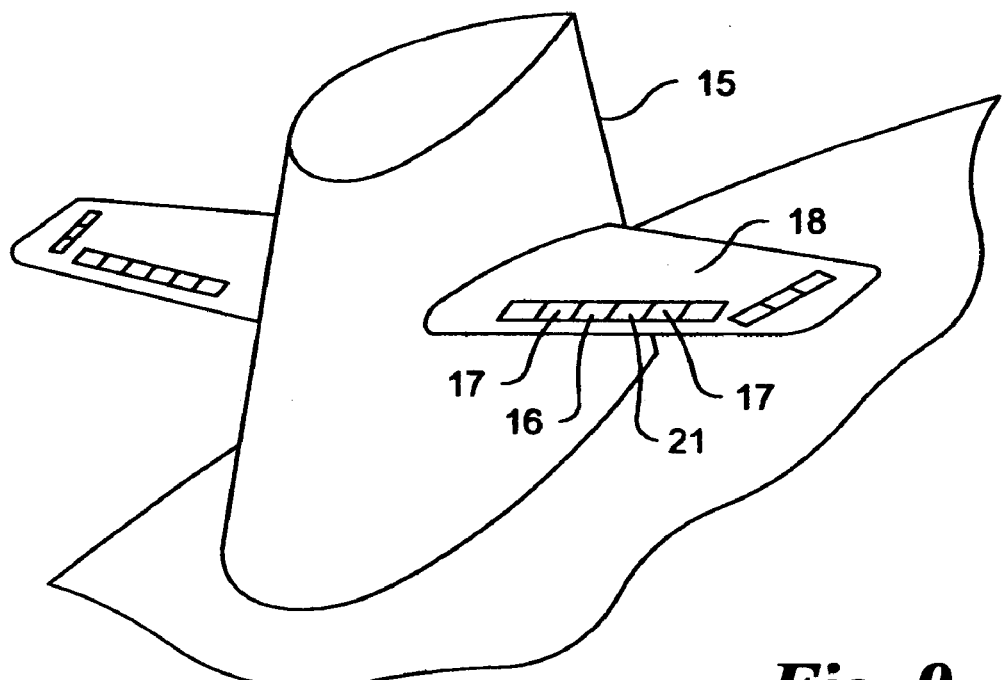
FIG. 9 is an exemplary schematic diagram showing the present invention attached to the surface of a control plane along a submarine.

The sensors 1 described above may also be fabricated via extrusion techniques as large sheets and thereafter mechanically cut to yield a large number of sensors 1, each having a very small presented area. The resultant sensors 1 are easily configured into an array 9 that is both closely packed and dense. It is possible for the density of sensors 1 within the array 9 to approach the pixel density in an LCD display. The adaptation of command and control architecture from LCD displays to the described arrays 9 allows for a high-density 'pixelized' acoustic array. As such, dimensionally large arrays 9 of the described sensor 1 facilitate acquisition of high-resolution acoustic images. The sensors 1 and arrays 9 described above are adaptable to a variety of locations on a vessel or structure. Referring now to FIG. 9, a receiver array 21 is shown attached to the control plane 18 of a submarine 15. The receiver array 21 is shown co-located with transmitter arrays 17 and an electronics package 16. A variety of transmitter arrays 17 known within the art may be used to generate the acoustic signal received by the sensors 1 within the receiver array 21. Likewise, the electronics package 16 may include circuits known within the art or described herein to control receiver array 21 and/or transmitter arrays 17. It is also possible to provide one or more receiver arrays 21, transmitter arrays 17, and electronics packages 16 along the pressure hull of a submarine 15.

The description above indicates that a great degree of flexibility is offered in terms of the present invention. Although the present invention has been described in considerable detail with reference to certain preferred versions thereof, other versions are possible. Therefore, the spirit and scope of the appended claims should not be limited to the description of the preferred versions contained herein.

The invention claimed is:

1. A pressure sensitive sensor with sonar applications comprising:
    (a) an electrically conductive movable layer;
    (b) an electrically conductive rigid layer, said electrically conductive rigid layer is a hull or a sea-based structure; and
    (c) a pressure conduction composite disposed between and bonded to said electrically conductive movable layer and said electrically conductive rigid layer, said pressure conduction composite composed of a plurality of conductive particles electrically isolated within a non-conductive matrix, said pressure conduction composite having a conductance that increases with pressure when compressed by an acoustic wave.

2. The pressure sensitive sensor of claim 1, wherein said pressure conduction composite has a plurality of voids.

3. The pressure sensitive sensor of claim 1, further comprising a waterproof coating.

4. A real-time reconfigurable array with sonar applications comprising a plurality of pressure sensitive sensors of claim 1.

5. A real-time reconfigurable array with sonar applications comprising a plurality of pressure sensitive sensors of claim 2.

6. A real-time reconfigurable array wit sonar applications comprising a plurality of pressure sensitive sensors of claim 3.

7. The pressure sensitive sensor of claim 1, wherein said pressure conduction composite is impregnated with an inorganic oil.

8. A real-time reconfigurable array with sonar applications comprising a plurality of pressure sensitive sensors of claim 7.

9. The real-time recontigurable array as in one of claims 4,5,6,8, wherein each said pressure sensitive sensor is separately integrated onto an electronics layer having a plurality of switches to enable and disable said pressure sensitive sensors and to modify an output signal from said pressure sensitive sensors.

10. The real-time reconfigurable array of claim 9, wherein at least one said pressure sensitive sensor is controlled via a Field Effect Transistor.

11. The real-time reconfigurable array of claim 10, wherein said switches are controlled by a microcontroller, a DSP, a FPGA or a DAC.

12. The real-time reconfigurable array of claim 9, wherein at least one said pressure sensitive sensor is controlled via a Thin-Film Transistor.

13. The real-time recontigurable array of claim 12, wherein said switches are controlled by a microcontroller, a DSP, a FPGA or a DAC.

* * * * *